United States Patent [19]
Kaplan

[11] Patent Number: 5,793,354
[45] Date of Patent: Aug. 11, 1998

[54] METHOD AND APPARATUS FOR AN IMPROVED COMPUTER POINTING DEVICE

[75] Inventor: Alan Edward Kaplan, Morristown, N.J.

[73] Assignee: Lucent Technologies, Inc., Murray Hill, N.J.

[21] Appl. No.: 438,323

[22] Filed: May 10, 1995

[51] Int. Cl.$^6$ ........................................ G09G 5/00
[52] U.S. Cl. ................................. 345/157; 345/145
[58] Field of Search ........................ 345/145, 156–160, 345/161, 163, 167; 395/155

[56] References Cited

U.S. PATENT DOCUMENTS

| | | | |
|---|---|---|---|
| 5,012,231 | 4/1991 | Felsenstein | 345/161 |
| 5,148,152 | 9/1992 | Stueckle et al. | 340/706 |
| 5,191,641 | 3/1993 | Yamamoto et al. | 345/159 |
| 5,195,179 | 3/1993 | Tokunaga | 345/145 |
| 5,334,997 | 8/1994 | Scallon | 345/167 |
| 5,360,971 | 11/1994 | Kaufman et al. | 250/221 |
| 5,367,315 | 11/1994 | Pan | 345/158 |
| 5,398,044 | 3/1995 | Hill | 345/145 |
| 5,477,236 | 12/1995 | Nanbu | 345/157 |

OTHER PUBLICATIONS

"Isotrak II" Polhemus, pp. 1–3, Sep. 1996.

*Primary Examiner*—Amare Mengistu

[57] ABSTRACT

There is provided a method and apparatus for an improved computer pointing device. The present invention facilitates positioning the computer cursor and includes a pointing device for providing coordinate input signals and a gain control device for providing gain signals, wherein gain is defeined as the ratio of the cursor movement along the y-axis and x-axis relative to the corresponding amount movement of the pointing device along the y-axis and x-axis. The coordinate input signals and gain signals are received by a processor. The processor is operative to execute a program that scales the coordinate input signals as a function of a gain value determined from the gain signal. The processor then outputs the scaled coordinate input signals in a form simulating a mouse output. The pointing device can be any computer peripheral device capable of providing coordinate input signals indicating an amount of movement along the y-axis and x-axis. The gain control device is any device capable of providing gain signals to a processor. One embodiment of the gain control device includes a variable resistor to manipulate the magnitude of the gain signal. The gain control device can also include an analog/digital converter for converting the gain signal into digital form and a buffer amplifier for providing a low impedance input from the variable resistor to the analog/digital converter. Preferably the gain signals emanating from the gain control device is manipulable by a foot pedal mechanism.

18 Claims, 8 Drawing Sheets

METHOD AND APPARATUS FOR AN IMPROVED COMPUTER POINTING DEVICE

BACKGROUND OF THE INVENTION

1. Field of the Invention

This invention relates to computer peripheral devices, and particularly to an improved computer pointing device with a gain control device to swiftly adjust the resolution of cursor movement.

2. Background

Pointing devices are commonly used today in conjunction with software to position a computer cursor and to control the functioning of a computer. The computer cursor moves in relation to the movement of the pointing device under software control. Typical of such a pointing device is a computer mouse. The computer mouse is a hand-operated device that requires the user to remove his or her hand from a keyboard whenever the position of the cursor needs to be changed. Like all hand-operated pointing devices, the mouse can also be restricting to users with limited range of hand movement.

Experiments have been done with feet operated pointing devices that perform identical functions to the mouse. Such a device is commonly referred to as a "mole." Still other pointing devices can be operated with the eye, head or body parts other than the hand. However, all technologies that do not use the hand to operate the pointing device tend to suffer from the disadvantage that the small motor skills of the hand are better than those of other parts of the body. In other words, the hand-operated mouse allows the user to position the cursor more accurately than other pointing devices. This is not to say, however, that the positioning precision of the mouse cannot be improved.

It is therefore the object of the present invention to provide a method and apparatus for an improved computer pointing device that enhances cursor positioning precision and range of motion. It is further the object of this invention to provide an apparatus for making computer operation more efficient.

SUMMARY OF THE INVENTION

In the present invention, a computer peripheral device for providing a computer with signals that control the movement of a computer cursor is taught utilizing a gain control means, wherein gain is defined as the ratio of cursor movement along the y-axis and x-axis relative to the corresponding amount of movement by a pointing means along the y-axis and x-axis. The computer peripheral device comprises the pointing means and the gain control means. The pointing means provides coordinate input signals in response to detected movement of the pointing means. The gain control means provides gain signals which can then be used to scale the coordinate input signals. In one embodiment of the invention, the gain control means includes a variable resistor and a foot pedal mechanism. The variable resistor comprise of a resistance that is manipulable by the foot pedal mechanism for varying the magnitude of the gain signals emanating from the gain control means. The computer peripheral device can also include a plurality of switches for transmitting switch state signals indicative of commands corresponding to the current position of the computer cursor.

The coordinate input signals, gain signals and switch state signals are receivable by a first processing means. The first processing means performs one of two functions: process the signals or send it to a second processing means for processing. Regardless whether the signals are processed by the first or second processing means, the result is the output of scaled coordinate input signals in a form simulating a mouse output. In the preferred embodiment, the processing means first determines a gain value from the gain signals and scales the coordinate input signals as a function of the gain value to arrive at the desired output, i.e., scaled coordinate output signals in a form simulating a mouse output. Includable in the output are the switch state signals.

Advantageously, the present invention is also a computer peripheral device, to be used in combination with a pointing means, that provides gain signals to the processor for swiftly adjusting the resolution of cursor movement. This computer peripheral device is coupled to a processor and comprises a gain control means and an output means. The gain control means permits users to manipulate the magnitude of the gain signals. The output means is coupled to the gain control means and transmits the gain signals from the gain control means to the processor. In the preferred embodiment, the gain control means includes a variable resistor having a manipulable resistance for varying the magnitude of the gain signals and the output means is a analog/digital converter that transforms the gain signals into digital form. A buffer amplifier can be interposed between the variable resistor and analog/digital converter to provide proper input to the analog/digital converter. The computer peripheral device can include its own processing means for receiving the gain signals from the output means and the coordinate input signals from the pointing means. The processing means will either transmit the received signals in its original form to another processing means for processing or process the signals itself to output scaled coordinate input signals in a form simulating a mouse output.

Also in accordance with the present invention is a method for facilitating the movement of the computer cursor utilizing a gain control means for increasing user control over a pointing means. This comprises the steps of receiving a first and second set of coordinate input signals from the pointing means; determining an amount of change along the y-axis and x-axis from the first and second set of coordinate inputs signals; receiving gain signals from the gain control means; calculating a gain value using the gain signals; and scaling the amount of change along the y-axis and x-axis as a function of the gain value. The method can also include the step of manipulating the gain control means to vary the magnitude of the gain signals. Manipulation of the gain control means can be accomplished by depressing and releasing a foot pedal mechanism. Upon scaling the coordinate input signals, the method can also include the step of outputting the scaled amount of change along the y-axis and x-axis in a form simulating a mouse output.

These and other features, aspects, and advantages of the present invention will become better understood with regard to the following description, appended claims, and accompanying drawings.

3

Figure 1:
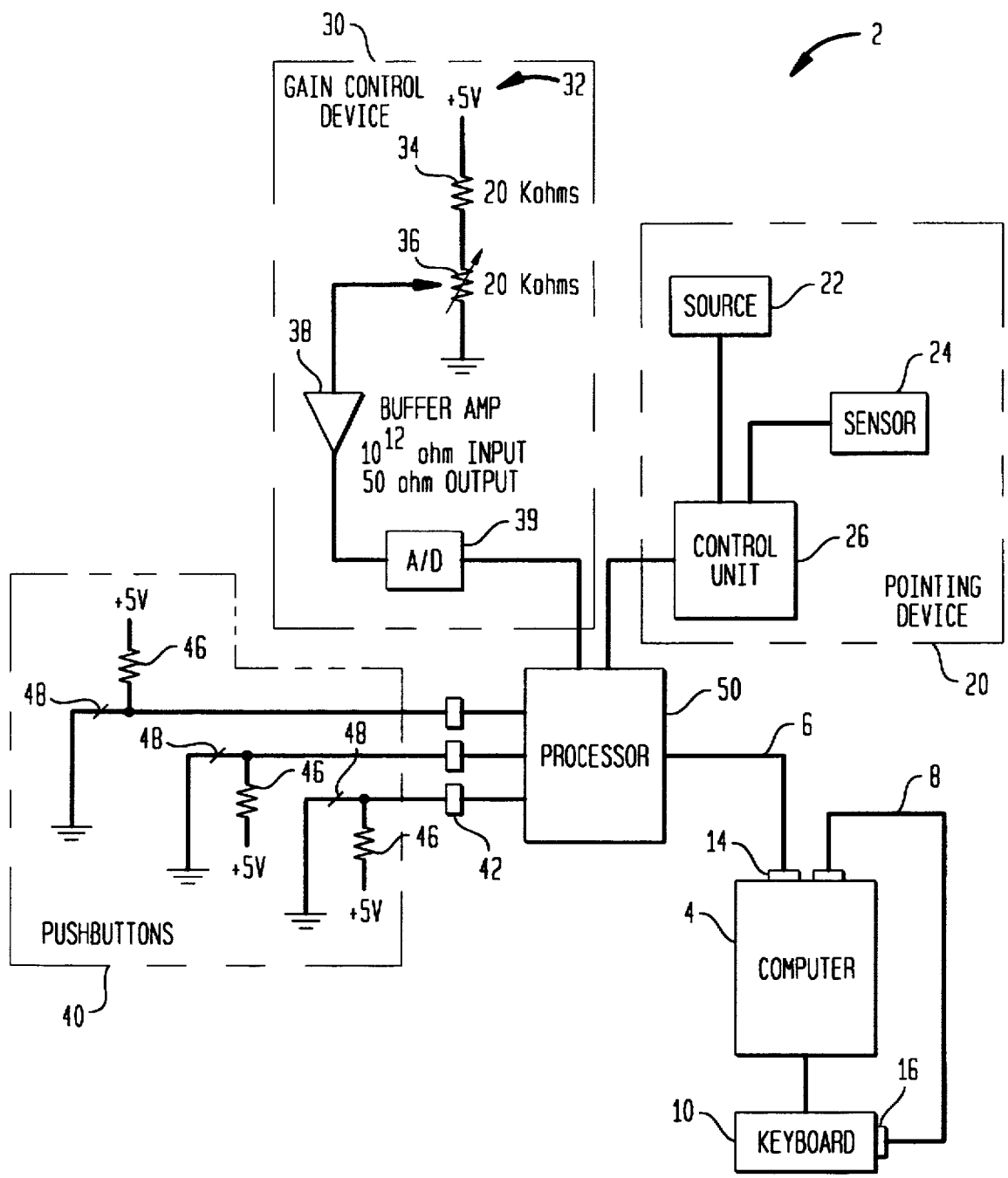
FIG. 1 is a schematic diagram depicting an embodiment of the present invention.
Figure 3:
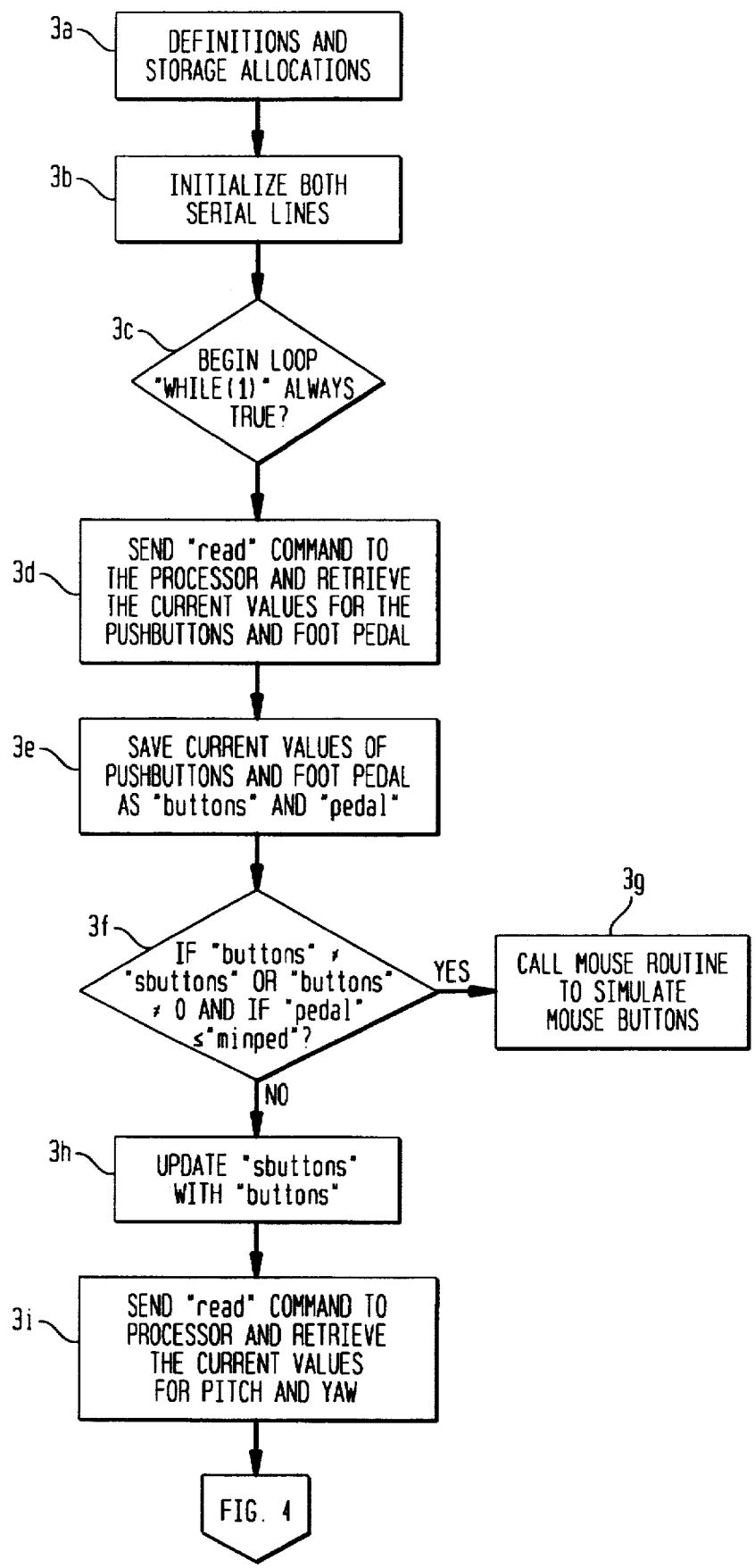
FIGS. 3 and 4 are flowcharts depicting an example of a processing means for transforming the serial stream to simulate a computer mouse.
Figure 4:
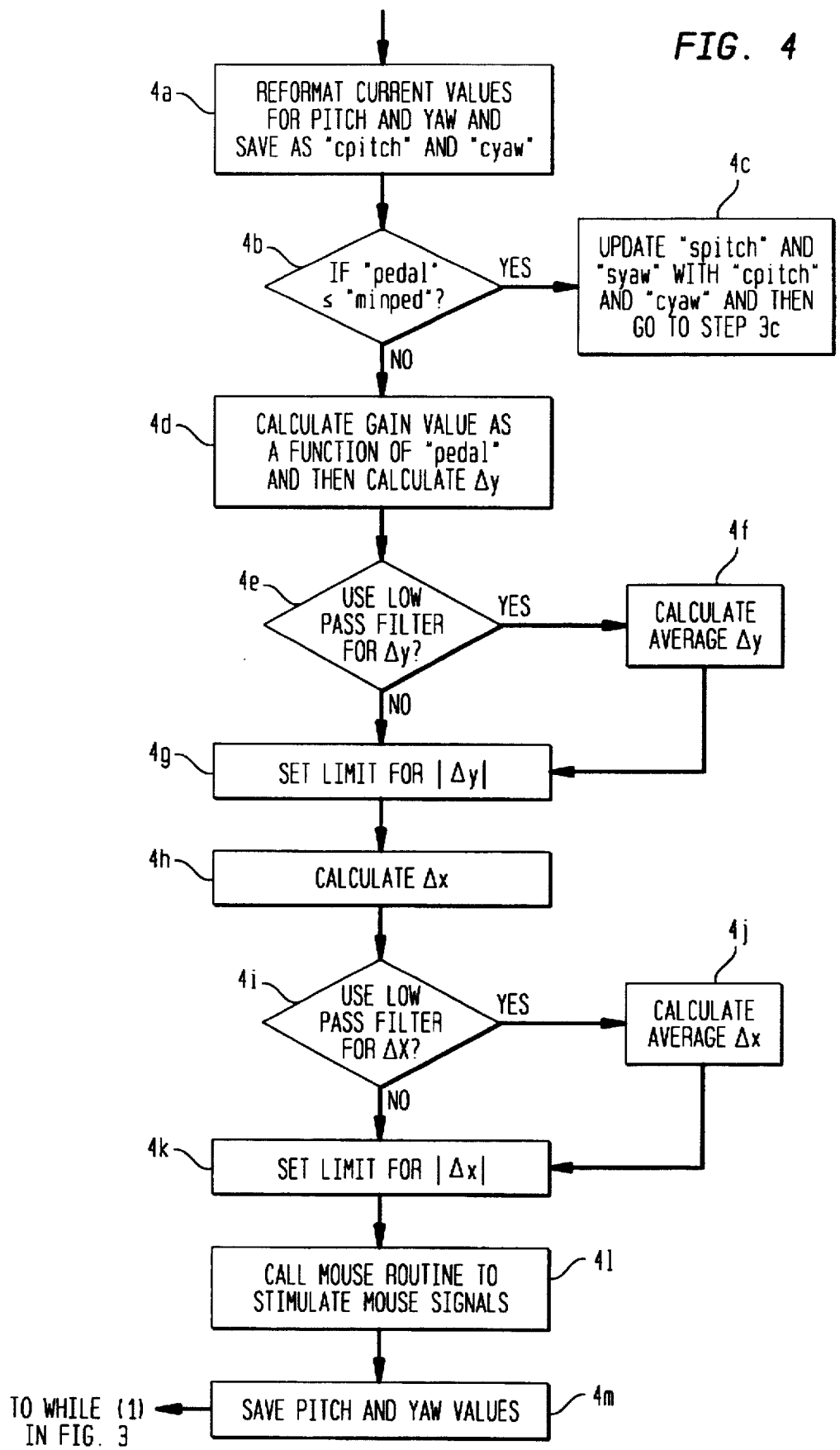
Figure 5:
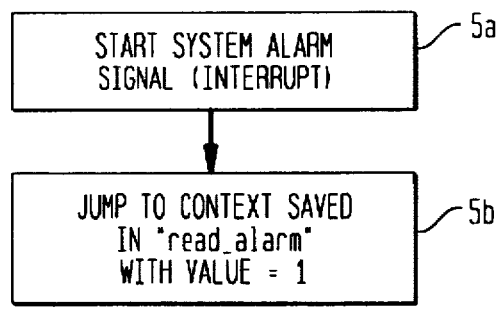
Figure 6:
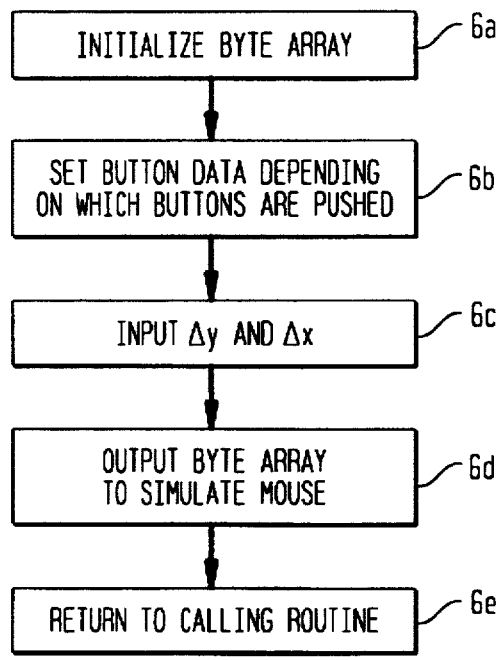
Figure 10:
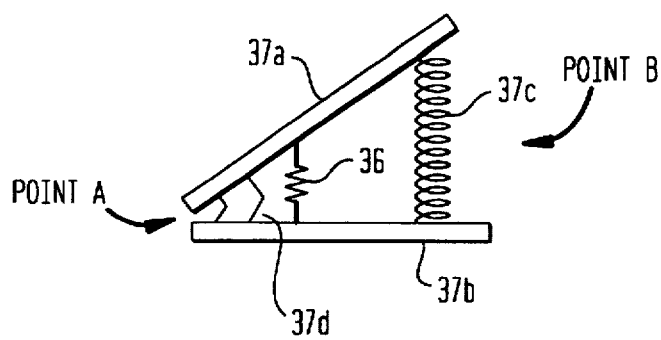
Figure 7:
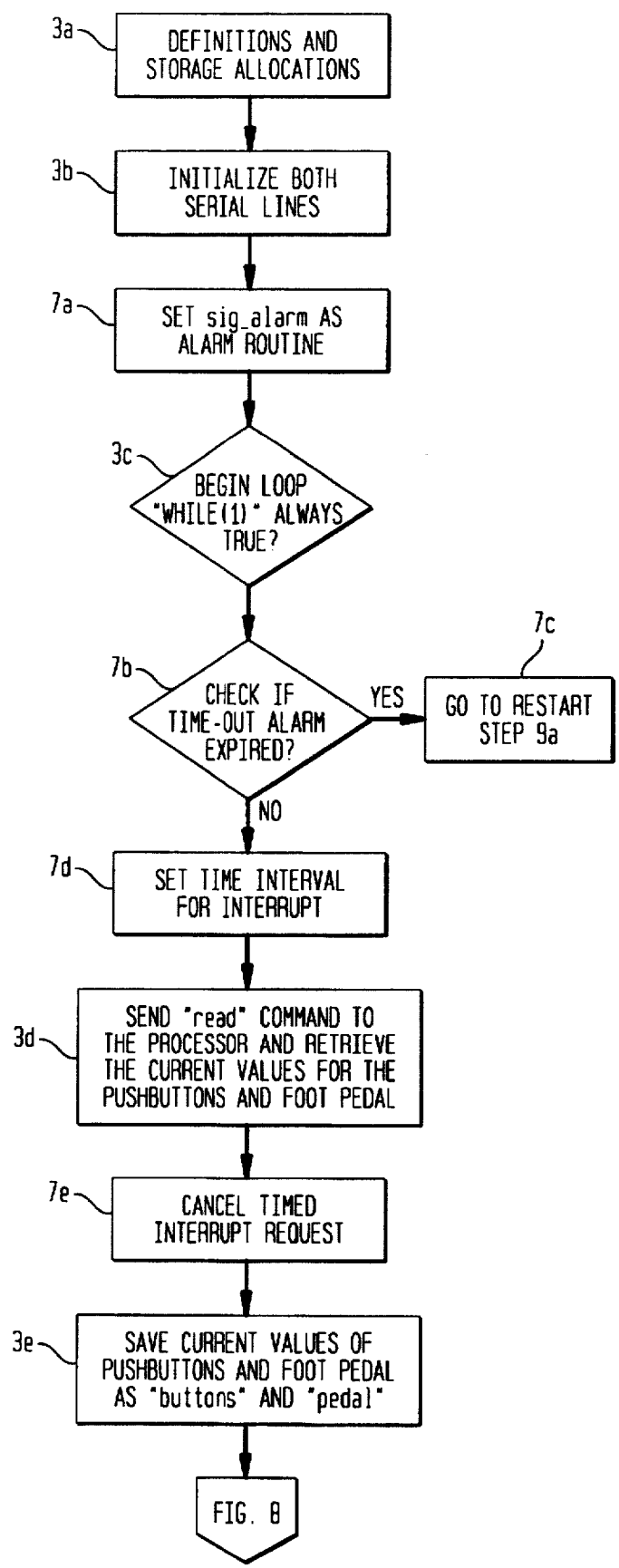
Figure 8:
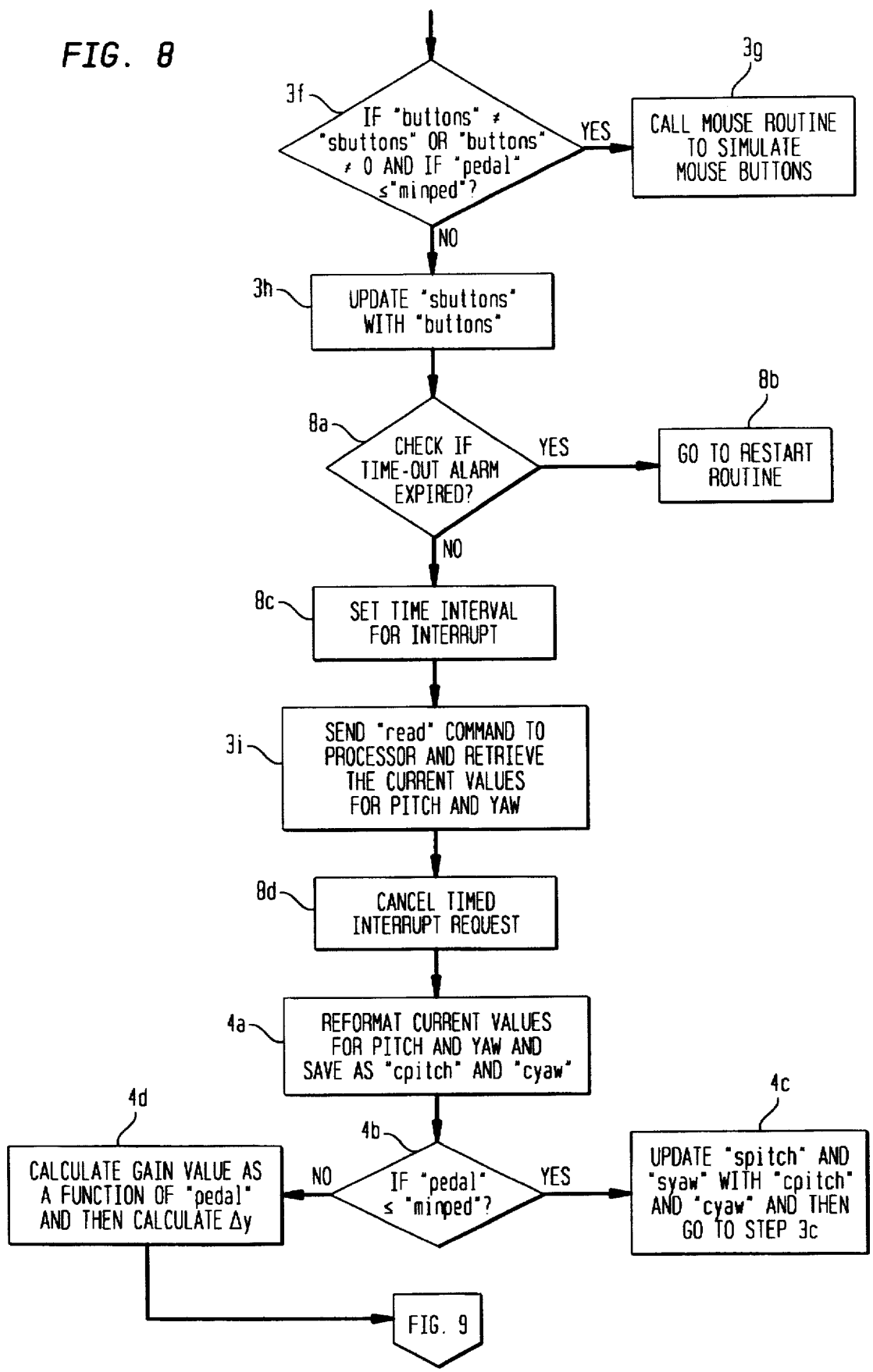
Figure 9:
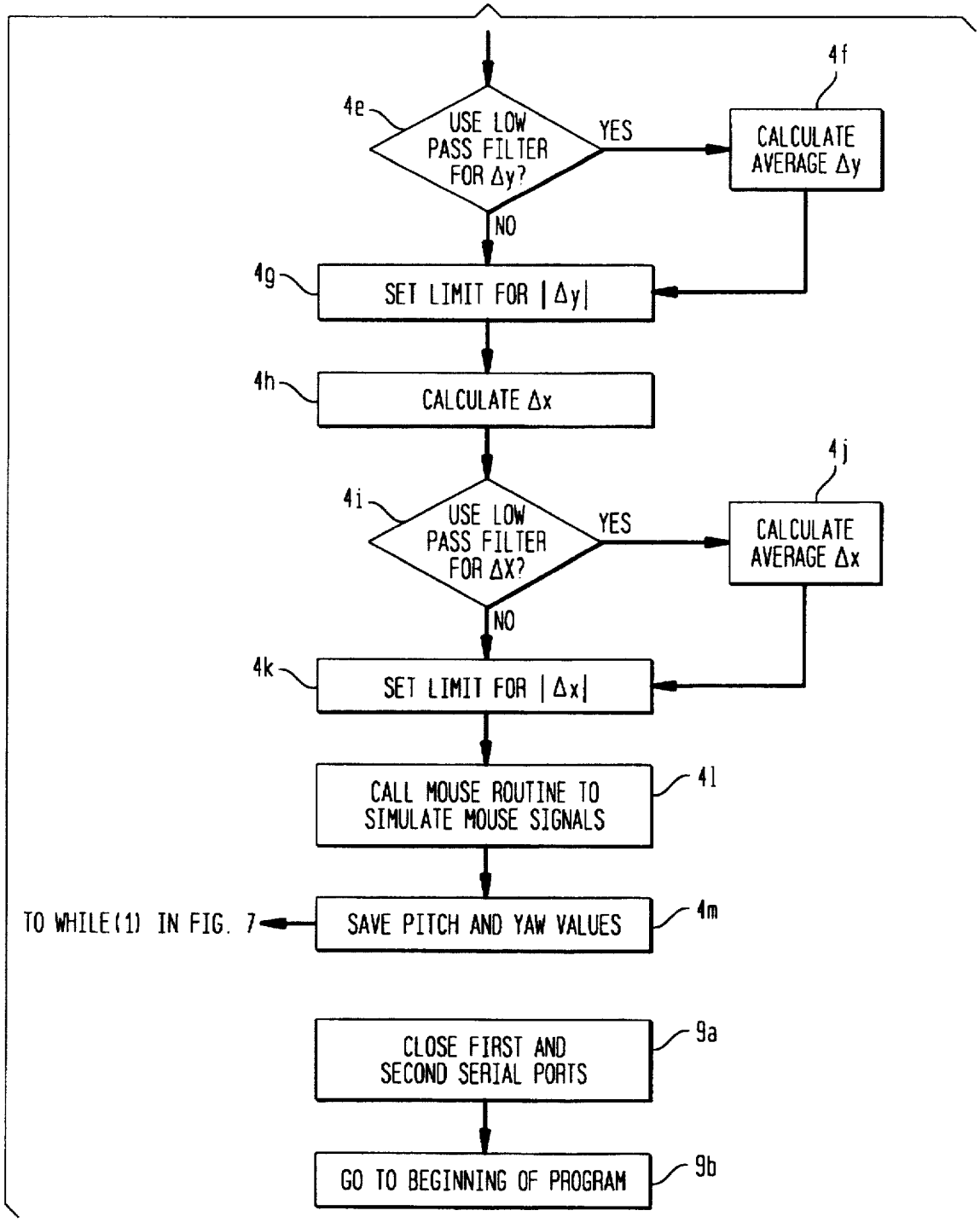

FIG. 5 is a flowchart depicting an example of a sig_alarm routine that executes upon the occurrence of an interrupt;

FIG. 6 is a flowchart depicting an example of a mouse routine for the Logitek® mouse referenced in FIGS. 3 and 4;

FIGS. 7, 8 and 9 are the flowcharts depicted in FIGS. 3 and 4 with embedded alarms routine; and FIG. 10 is a side view of a foot pedal mechanism for varying the gain signal from the gain control device in FIG. 1.

DESCRIPTION

As shown in FIG. 1, a hands-free mouse unit 02 is connected via a serial line 06 to a first serial port 14 in a computer 04. The hands-free mouse unit 02 transmits cursor position signals to the computer 04 and comprises a pointing device 20, a gain control device 30, a plurality of pushbuttons 40 and a processor 50. The hands-free mouse unit 02 transmits signals which are subsequently converted by a processing means within the computer 04 in a form simulating a mouse output and later transmitted by the processing means to a mouse port 16 in a keyboard 10 connected to the computer 04 where it is subsequently processed by a mouse driver program.

The pointing device 20 can be any number of products that provides coordinate input signals indicating an amount of movement along the y-axis and along the x-axis in response to physical movement of the pointing device 20. Note that some pointing devices 20 provides coordinate input signals indicating changes in pitch (i.e., elevation) and yaw (i.e., azimuth) which may be converted to a corresponding amount of movement along the y-axis and x-axis. Typical of pointing devices are mice, track balls, moles, eye-tracking technology, joysticks and position trackers, such as mechanical, optical, magnetic and acoustic. Such devices and their technology are well known in the art.

In the preferred embodiment of the invention, the pointing device 20 employed is an alternating current magnetic position tracker manufactured by Polhemus called 3Space® Isotrak®. The 3Space® Isotrak® comprises a source 22, a sensor 24 and a control unit 26. The source 22 is constructed of three mutually perpendicular emitter coils, not shown, that generate three perpendicular rotating magnetic fields. The sensor 24 is constructed of three mutually perpendicular sensor coils, not shown. The three magnetic fields generated from the source 22 induce three currents in each of the sensor coils. The current induced in each sensor coil will vary depending on its distance and angle from the source 22. This provides a basis for the control unit 26 to calculate relative pitch and yaw values. These values are subsequently transmitted from the control unit 26 to the processor 50. The pitch and yaw values are then used to calculate a corresponding amount of movement by the 3Space® Isotrak® along the y-axis and x-axis, respectively. The calculation process comprises the following steps: (1) determining Δpitch and Δyaw, which are the difference between a first and second set of pitch and yaw values, respectively; and (2) multiplying the sine function for Δpitch and Δyaw against a predetermined distance D (i.e., the distance the sensor 24 is assumed to be from a computer monitor, not shown). The above briefly described magnetic position tracker technology is well known in the art. In one embodiment of the invention, the sensor 24 is placed on a user's head for hands-free operation. By varying the angle of the head, the user can manipulate the cursor on the computer monitor.

To increase user control over any pointing device 20, the present invention includes a gain control device 30. "Gain" is defined as the ratio of cursor movement along the y-axis and x-axis relative to the corresponding amount of movement by the pointing device 20 along the y-axis and x-axis. The gain control device 30 includes, but is not limited to, one of the following devices that permits users to manipulate the magnitude of a gain signal: an optical shaft encoder; an accelerometer; an electrolytic inclinometer; a pressure gauge; a strain gauge; a photocell and light source that are moved together or apart.

One embodiment of the gain control device 30 comprises the following electrical components coupled in series: power supply 32 to fixed resistor 34 to variable resistor 36 to buffer amplifier 38 to analog/digital converter 39. The gain control device 30 outputs to the processor 50 a voltage signal in binary digit form. In this embodiment, the voltage signal is used as the gain signal. By varying the resistance of the variable resistor 36, the user can swiftly control the magnitude of the voltage fed to the buffer amplifier 38. The buffer amplifier 38 is designed with a high input impedance and low output impedance to minimize the load on the variable voltage and to provide ample "drive" for the analog/digital converter 39. The buffer amplifier 38 transforms the voltage signal into a low input impedance for the analog/digital converter 39 where it is subsequently output in binary digit form to the processor 50 and later used for calculating a gain value.

The preferred embodiment of the invention utilizes a foot pedal mechanism 37, as shown in FIG. 10, to vary the impedance of the variable resistor 36 for hands-free operation. The foot pedal mechanism 37 comprises an upper portion 37a, a lower portion 37b, a spring 37c and a hinge 37d. The upper portion 37a and lower portion 37b are hinged to each other at or near point A by the hinge 37d and are separated at point B by the spring 37c, which is interposed between the upper portion 37a and lower portion 37b, allowing the foot pedal mechanism 37 to move between an up and down position. The variable resistor 36 is positioned within the foot pedal mechanism 37 in a manner permitting the user to vary the resistance of the variable resistor 36 by manipulating the foot pedal mechanism 37 between the up and down position.

Figure 2:
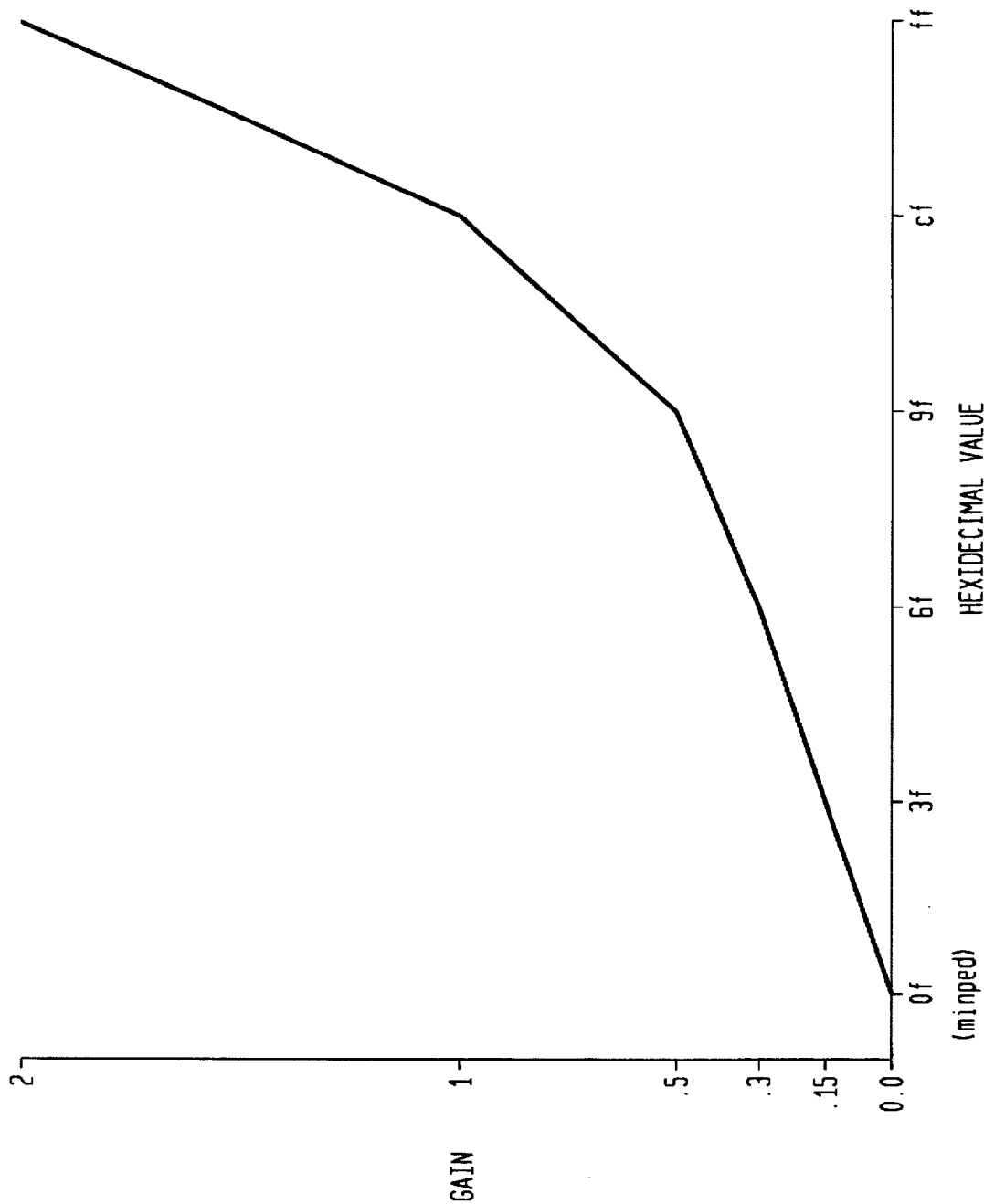
FIG. 2 is a graph depicting an example of a relationship between the amount of gain and hexadecimal value for the gain signal.

The gain control device 30 permits users to swiftly manipulate the gain of the pointing device 20 so small movements may be easily performed by lowering the gain and fast movements can be quickly accomplished by raising the gain. As mentioned earlier, the resistance of the variable resistor 36 can be varied using the foot pedal mechanism 37. For each position of the foot pedal mechanism 37, there is an associate gain signal. Depressing the foot pedal mechanism 37 increases the resistance and causes an increased gain signal to be transmitted. In the preferred embodiment, the relationship between the gain value and the gain signal (expressed in hexadecimal notation from the analog/digital converter 39) is piecewise linear, as shown in FIG. 2. Other relationships may also be applied. Slight depression of the foot pedal mechanism 37 allows the user to decrease the gain and enhance cursor positioning precision. This compensates for users with poor motor skills. Increased depression of the foot pedal mechanism 37 increases the gain allowing the user to re-position the cursor larger distances quickly with smaller movements of the pointing device 20. This is particularly advantageous for users having a limited range of motion with the body part which operates the pointing device 20. Most users use large gain and small gain settings depending on the amount of movement desired.

Additionally, the relationship in FIG. 2 provides the gain control device 30 with a "clutch" function for re-centering operations. The "clutch" function is akin to picking a conventional computer mouse off the surface and re-centering it without changing the position of the cursor. This gives the user freedom to move the pointing device 20 without re-positioning the cursor. The "clutch" function is accomplished by assigning a gain value of zero to a range of hexadecimal values less than or equal to a predetermined value. This predetermined hexadecimal value is referred to as "minped." As shown in FIG. 2, "minped" is equal to hexadecimal value "0f."

Referring back to FIG. 1, the present invention includes the pushbuttons 40 for supplying various instructions with respect to the current position of the cursor. The pushbuttons 40 are interposed between power supplies 44 and parallel ports 42 of the processor 50 and comprise a resistor 46 and a switch 48 having a positive "on" and a positive "off" position. The switch 48 remains in the positive "on" position unless depressed by the user. In the positive "off" position, a voltage (approximately 5 volts) indicative of switch state is transmitted in the form of a single byte to the processor 50. In the positive "on" position, approximately zero voltage is transmitted. Alternately, keyboard buttons or verbal buttons (used with a word spotting program) could be used to perform the functions of the pushbuttons 40.

The signals transmitted from the pushbuttons 40, control unit 26 and analog/digital converter 39 have associated values and are stored in the processor 50 until they are retrieved by the computer 04. The present invention includes a processing means within the computer 04 operative to execute a program stored in associated memory for retrieving the aforementioned values and then outputting them in the form of a byte array simulating a mouse output. FIGS. 3, 4 and 6 are flowcharts illustrating such a processing means. FIGS. 3 and 4 represent a flowchart of a main routine and FIG. 6 represents a flowchart of a subroutine called by the main routine.

As shown in FIG. 3, the main routine begins by declaring definitions and storage allocations in step 3a and initializing both serial lines 06 and 08 in step 3b. Step 3c marks the beginning of a loop which continuously processes information from the processor 50. This loop executes approximately twenty times per second. In step 3d, the routine transmits a "read" command to the processor 50 and retrieves the current pushbuttons 40 byte values and analog/digital converter 39 hexadecimal value. The current byte and hexadecimal values are saved as "buttons" and "pedal," respectively, in step 3e. Step 3f checks to determine whether the position of pushbuttons 40 have changed since the last execution of the loop by comparing "buttons" to "sbuttons," i.e., previously saved byte values for the pushbuttons 40, and whether the pushbuttons 40 are currently depressed. The value "sbuttons" were initially set to zero in step 3a. If (1) either "buttons" differs from "sbuttons" or "buttons" do not equal zero and (2) if "pedal" is less than or equal to "minped" (which was set in step 3a), then the routine proceeds to step 3g and calls the mouse routine depicted in FIG. 6 to output the byte value as if it was transmitted by a mouse. If either conditions are false, the main routine continues to step 3h.

In the mouse routine, the contents of "buttons" will be input into a byte array. The mouse routine depicted in FIG. 6 outputs a byte array simulating a Logitek® mouse output. It should be understood that other brands of mice could just as easily have been simulated. The mouse routine begins with initialization of the byte array in step 6a. Step 6b proceeds to input the contents of "buttons" into the byte array depending on which pushbuttons 40 were pushed. The mouse routine continues to step 6c where it inputs the values for $\Delta y$ and $\Delta x$. Unless the mouse routine was called by step 4l, the values for both $\Delta y$ and $\Delta x$ would be zero. Step 6d outputs the byte array to the computer 04 through the mouse port 16 where the byte array is processed the mouse driver. Control is then returned to the calling routine. Step 3h proceeds to update "sbuttons" with the contents in "buttons" for future reference.

The following sequence of steps deals with the re-positioning of the cursor. In step 3i, a "read" command is transmitted to the processor 50 to retrieve the current values for pitch and yaw. For ease of manipulation, step 4a reformats and sign extends the current pitch and yaw signals as "cpitch" and "cyaw." Step 4b decides whether any action must be performed with the computer cursor based on these values. If "pedal" is less than or equal to "minped," the routine assumes the user is performing re-centering operations and goes to step 4c so it can update the previously saved pitch and yaw values, i.e., "spitch" and "syaw," respectively, with its current values for future reference. The routine is then returned to the beginning of the loop at step 3c. Otherwise "pedal" is greater than "minped" and the routine assumes the user is re-positioning the cursor and proceeds to step 4d.

Step 4d first determines the gain value based on the hexadecimal value of "pedal" and a predetermined relationship between the two values. An example of such a relationship is illustrated in FIG. 2. Step 4d then proceeds to calculate $\Delta y$ for the computer cursor. The value $\Delta y$ (or $\Delta x$) represents the scaled amount of relative movement along the y-axis (or x-axis). This value is determined by calculating $\Delta$pitch, i.e., difference between "cpitch" and "spitch" (or $\Delta$yaw, i.e., difference between "cyaw" and "syaw"), converting $\Delta$pitch (or $\Delta$yaw) to a corresponding amount of movement along the y-axis (or x-axis) and using the gain value to scale the amount of movement. However, "noise" from the 3Space® Isotrak® can create false pitch and yaw readings which will cause the routine to generate a non-zero $\Delta y$ (and/or $\Delta x$) value although the sensor 24 and source 22 are completely stationary. The result is an undesirable oscillating cursor on the computer screen.

One embodiment of the routine includes a low pass filter routine for correcting the "noise" problem and stabilizing the computer cursor by using the average value of $\Delta y$ instead of the current $\Delta y$ value. This will stabilize the movement of the computer cursor.

Step 4d first determines whether the user opted to employ the low pass filter routine. If yes, the routine goes to step 4f which calculates an average $\Delta y$ based on the current $\Delta y$ and a predetermined number of prior $\Delta y$'s. The average $\Delta y$ value will be used to re-position the cursor. The routine continues to step 4g where it sets the maximum $\Delta y$, as required by the operating system. Steps 4h–k calculates $\Delta x$ for the computer cursor in the same manner steps 4d–g calculates $\Delta y$.

Upon calculating $\Delta y$ and $\Delta x$ (or average $\Delta y$ and $\Delta x$), step 4l calls the mouse routine. The values for $\Delta y$ and $\Delta x$ are input into the byte array in step 6c and then output to the mouse port 16 by step 6d causing the cursor to be re-positioned. Control is returned to the main routine where step 4m updates "spitch" and "syaw" with the contents of "cpitch" and "cyaw." The routine is subsequently looped back to step 3c where it can process the next set of signals from the processor 50.

Other versions of the main routine can be embedded with time-out alarms to correct "hanging" problems that may occur when there is no response to the "read" commands in steps 3d and 3i. One such embodiment is shown in FIGS. 7–9. This embodiment utilizes system calls and is executable in an UNIX® operating system. The time-out alarm operates on the principle that the "read" command must be completed within a specified time interval otherwise a system alarm will cause an interrupt to occur. Upon occurrence of the interrupt, a series of programming statements will notify the routine that the time-out alarm had expired. The serial lines 06 and 08 will then be closed and the main routine restarted.

Step 7a begins by initializing the time-out alarm. It instructs the operating system that the routine "sig_alarm," as shown in FIG. 5, is the routine to execute in the event of an interrupt. Step 7b proceeds to check whether the time-out alarm expired by using "setjmp" to save its stack environment in "read_alarm" for later use by "longjmp". A value of "0" is always returned in the initial loop. As long as the returned value remains "0" and is not changed by the "sig_alarm" routine, the time-out alarm is deemed not expired.

If the time-out alarm did not expire, the routine proceeds to step 7d where it sets the system alarm to lapse after a predetermined time interval. If step 3g is timely completed, the routine continues to step 7d where the system alarm is cancelled before the interrupt can occur. Otherwise the system alarm would cause an interrupt.

Upon occurrence of the interrupt, the "sig_alarm" routine in FIG. 5 is executed. Step 5a of the "sig_alarm" routine uses "longjmp" to restore the environment saved in "read_alarm" by the last call of "setjmp." It then causes execution to continue as if the call of "setjmp" had just returned a value of "1." When step 7b later checks the returned value, it will read "1" and conclude the time-out alarm expired. In such an event, the routine proceeds to step 7c and goes to the restart routine in FIG. 9. In steps 9a and 9b of the restart routine, the first and second serial lines 06 and 08 are closed and then the main routine is restarted. Likewise, steps 8a–d are identical in function to steps 7b–e and are used to confirm successful "read" commands for pitch and yaw values in step 3i.

In another embodiment of the invention, the above described processing means is within the processor 50 and the byte array is outputted directly to the mouse port 16 or computer 04.

Although the present invention has been described in considerable detail with reference to a certain preferred version thereof, other versions are possible. Therefore, the spirit and scope of the appended claims should not be limited to the description of the preferred version contained herein.

I claim:

1. A computer peripheral device for providing a computer with signals that control movement of a computer cursor comprising:
   a. a pointing means for providing coordinate input signals in response to detected movement of said pointing means;
   b. a gain control means for providing gain signals, wherein gain is the ratio of cursor movement along the y-axis and x-axis relative to the corresponding amount of movement by said pointing means along the y axis and x-axis, said gain signals used for scaling said coordinate input signals;
   c. a plurality of switches for transmitting switch state signals indicative of commands corresponding to the current position of said computer cursor; and
   d. a first processing means capable of receiving and transmitting said coordinate input signals, gain signals and switch state signals.

2. The computer peripheral device of claim 1 further comprising:
   e. a mouse output simulation processing means capable of receiving said coordinate input signals, gain signals and switch state signals from said first processing means and outputting scaled coordinate input signals and said switch state signals in a form simulating mouse input.

3. The computer peripheral device as recited in claim 2 wherein said mouse output simulation processing means further capable of determining gain values from said gain signals and scaling said coordinate input signals as a function of said gain values.

4. A computer peripheral device for providing a computer with signals that control movement of a computer cursor comprising:
   a. a pointing means for providing coordinate input signals in response to detected movement of said pointing means;
   b. a gain control means for providing gain signals, wherein gain is the ratio of cursor movement along the y-axis and x-axis relative to the corresponding amount of movement by said pointing means along the y axis and x-axis, said gain signals used for scaling said coordinate input signals; and
   c. a mouse output simulation processing means capable of receiving said coordinate input signals and gain signals and outputting scaled coordinate input signals in a form simulating a mouse output.

5. A computer peripheral device for providing a computer with signals that control movement of a computer cursor comprising:
   a. a pointing means for providing coordinate input signals in response to detected movement of said pointing means; and
   b. a gain control means for providing gain signals, wherein gain is the ratio of cursor movement along the y-axis and x-axis relative to the corresponding amount of movement by said pointing means along the y axis and x-axis, said gain signals used for scaling said coordinate input signals wherein said gain control means includes a variable resistor and a foot pedal, said variable resistor having a manipulable resistance responsive to said foot pedal mechanism for varying the magnitude of said gain signals emanating form said gain control means.

6. The computer peripheral device as recited in claim 5 wherein said pointing means is a position tracker for hands-free operation of said computer peripheral device.

7. A computer peripheral device coupled to a processor, in combination with a pointing means for providing coordinate input signals, wherein said computer peripheral device transmits gain signals to said processor for swiftly adjusting the resolution of cursor movement comprising:
   a. a gain control means for manipulating magnitude of said gain signals, wherein gain is the ratio of cursor movement along the y-axis and x-axis relative to the corresponding amount of movement by said pointing means along the y-axis and x-axis; and
   b. an output means coupled to said gain control means for transmitting said gain signals to said processor.

8. The computer peripheral device as recited in claim 7 wherein said computer peripheral means includes a variable resistor having a manipulable resistance for varying the magnitude of said gain signals.

9. The computer peripheral device as recited in claim 8 wherein said output means is an analog/digital converter that transforms said gain signals into digital form.

10. The computer peripheral device as recited in claim 9 wherein said gain control means includes a buffer amplifier interposed between said variable resistor and said analog/digital converter for providing a low input impedance from said variable resistor to said analog/digital converter.

11. The computer peripheral device as recited in claim 7 further comprising:
   c. a first processing means within said processor capable of receiving and transmitting said coordinate input signals and gain signals.

12. The computer peripheral device as recited in claim 11 further comprising:
   d. a second processing means capable of receiving said coordinate input signals and gain signals from said first processing means and outputting scaled coordinate input signals in a form simulating a mouse output.

13. The computer peripheral device as recited in claim 12 wherein said second processing means further capable of determining gain values from said gain signals and scaling said coordinate input signals as a function of said gain values.

14. The computer perpheral device as recited in claim 7 further comprising:
   c. a mouse output simulation processing means within said processor capable of receiving said coordinate input signals and gain signals and outputting scaled coordinate input signals in a form simulating a mouse output.

15. A method for facilitating the movement of a computer cursor utilizing a gain control means for providing gain signals for increasing user control over a pointing means, wherein gain is the ratio of cursor movement along the y-axis and x-axis relative to the corresponding amount of movement along the y-axis and x-axis by said pointing means comprising the steps of:
   a. receiving a first and second set of coordinate input signals from said pointing means;
   b. determining an amount of change along x-axis and y-axis from said first and second set of coordinate input signals;
   c. receiving gain signals from said gain control means;
   d. calculating gain values using said gain signals; and,
   e. scaling said determined amount of change along x-axis and y-axis as a function of said gain value.

16. The method recited in claim 15 comprising the additional steps of:
   f. manipulating said gain control means to vary magnitude of said gain signal.

17. The method recited in claim 15 wherein said manipulation of said gain control means accomplished by depressing and releasing a foot pedal mechanism.

18. The method recited in claim 15 comprising the additional steps of:
   f. outputting said scaled amount of change along x-axis and y-axis in a form simulating a mouse output.

* * * * *